(12) United States Patent
Liu et al.

(10) Patent No.: US 9,621,306 B2
(45) Date of Patent: Apr. 11, 2017

(54) METHOD, SYSTEM AND APPARATUS FOR ACK/NACK RESOURCE RESERVATION

(75) Inventors: Tingting Liu, Beijing (CN); Yanan Lin, Beijing (CN); Zukang Shen, Beijing (CN)

(73) Assignee: CHINA ACADEMY OF TELECOMMUNCATIONS TECHNOLOGY, Beijing (CN)

( * ) Notice: Subject to any disclaimer, the term of this patent is extended or adjusted under 35 U.S.C. 154(b) by 530 days.

(21) Appl. No.: 13/389,801

(22) PCT Filed: Aug. 18, 2010

(86) PCT No.: PCT/CN2010/076101
§ 371 (c)(1),
(2), (4) Date: Mar. 7, 2012

(87) PCT Pub. No.: WO2011/020433
PCT Pub. Date: Feb. 24, 2011

(65) Prior Publication Data
US 2012/0155413 A1 Jun. 21, 2012

(30) Foreign Application Priority Data
Aug. 18, 2009 (CN) .......................... 2009 1 0090953

(51) Int. Cl.
*H04W 4/00* (2009.01)
*H04L 1/18* (2006.01)
(Continued)

(52) U.S. Cl.
CPC .......... *H04L 1/1861* (2013.01); *H04L 5/0055* (2013.01); *H04L 5/0094* (2013.01);
(Continued)

(58) Field of Classification Search
USPC ....... 370/280, 281, 338, 330, 328, 329, 336; 455/422.1
See application file for complete search history.

(56) References Cited

U.S. PATENT DOCUMENTS

2009/0059884 A1   3/2009  Zhang et al.
2014/0029545 A1*  1/2014  Kim et al. .................... 370/329

FOREIGN PATENT DOCUMENTS

CN    101001137 A    7/2007
CN    101127584 A    2/2008
(Continued)

OTHER PUBLICATIONS

International Search Report issued International Application No. PCT/CN2010/076101, dated Dec. 2, 2010.
(Continued)

*Primary Examiner* — Zewdu A Beyen
(74) *Attorney, Agent, or Firm* — Handal & Morofsky, LLC

(57) ABSTRACT

A method, a system and an apparatus for ACK/NACK resource reservation are provided. The method includes: a base station configures and notifies usable uplink control channel resources to a user terminal using transmit diversity for ACK/NACK transmission, said base station receives the ACK/NACK transmitted by the said user terminal on the configured channel resources. The reservation of channel resource that is used in ACK/NACK feedback is realized, and the method for resource reservation supports transmit diversity, and improves the reliability of uplink control channel transmission, and the method is simple and easy to implement.

4 Claims, 7 Drawing Sheets

(51) Int. Cl.
    *H04B 7/06*    (2006.01)
    *H04L 1/06*    (2006.01)
    *H04L 5/00*    (2006.01)

(52) U.S. Cl.
    CPC .............. *H04B 7/0613* (2013.01); *H04L 1/06* (2013.01); *H04L 5/001* (2013.01); *H04L 5/0023* (2013.01); *H04L 5/0082* (2013.01)

(56) References Cited

FOREIGN PATENT DOCUMENTS

| CN | 101227203 A | 7/2008 |
| CN | 101489255 A | 7/2009 |
| WO | 2009078628 A1 | 6/2009 |

OTHER PUBLICATIONS

3GPP TS 36213 v8.7.0, Technical Specificaiton, 3rd Generation Partnership Project; Technical Specification Group Radio Access Network; Evolved Universal Terrestrial Radio Access (E-UTRA); Physical Layer Procedures (Release 3); May 2009.

Office Action issued in Chinese Patent Application No. 200910090953.0, dated Aug. 27, 2012, (In Chinese).

Office Action issued in Chinese Patent Application No. 200910090953.0, dated Aug. 27, 2012, (In English).

\* cited by examiner

--PRIOR ART--

--PRIOR ART--

METHOD, SYSTEM AND APPARATUS FOR ACK/NACK RESOURCE RESERVATION

The present application claims the priority of the Chinese patent application with the application date of Aug. 18, 2009, the application number of 200910090953.0, and the patent name of "ACK/NACK resource reservation method, system and apparatus", all content of the priority application is combined into the present application by quoting.

FIELD OF THE PRESENT INVENTION

The present invention relates generally to the field of Mobile communication technology, and more particularly to ACK/NACK resource reservation method, apparatus and system.

BACKGROUND OF THE PRESENT INVENTION

LTE (Long Term Evolution) system adopts HARQ (Hybrid Automatic Repeat request) to improve the reliability of the data transmission. After turning on the downlink HARQ function, UE (User Equipment) decodes the received downlink assignment, if the decoding is correct, UE feeds back ACK to the base station, if the decoding failure, UE feeds back NACK to the base station and requires the base station to transmit the assignment again. When the semi-persistent downlink scheduling service is finished, the base station will send the SPS (Semi-persistent Scheduling) resource release indication to UE, and notify the UE to release all resources which configured for the service. UE will feed back ACK to base station after the UE correctly received the indication.

For the LTE multi-carrier aggregation system, the base station uses more than one downlink carrier in a sub-frame to send the data to UE, each carrier has an independent HARQ entity, therefore, UE needs to feed back multiple ACK/NACK information in a uplink sub-frame.

For the above-mentioned ACK/NACK feedback problems, existing technology defined in LTE Rel-8 can be used for feedback transmission, specific comprising: bundling and multiplexing, namely, using one PUCCH (Physical Uplink Control Channel) channel resource to feed back multiple ACK/NACK information. These two methods are described in the following respectively, therein, assuming that the feedback window length is L, L is the number of downlink sub-frames which need to feed back the ACK/NACK information in the same uplink sub-frame. For FDD system, L equal to 1; and for TDD system, L equal to M. For different uplink-downlink configuration and uplink sub-frame, the value of M is different, it is shown in table 1, the number of K in each row.

TABLE 1

Downlink assoviation set index K: $\{k_0, k_1, \cdots k_{M-1}\}$ for TDD

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 1-continued

Downlink assoviation set index K: $\{k_0, k_1, \cdots k_{M-1}\}$ for TDD

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For ACK/NACK bundling mode, performing logic AND for M' ACK/NACK corresponding to the same user and same codeword, getting 1 or 2 bit (downlink two codewords) feedback information, FIG. 1 shows that single codeword and multiple codeword bundling process. In this case, it just needs to use PUCCH Format 1a/1b to feed back 1 or 2 bit ACK/NACK. The method also can effectively solve the PUCCH coverage problem, and is fitting for the cell edge UE.

For ACK/NACK multiplexing mode, it also applies to the PDSCH with single codeword and multiple codeword. For multiple codeword PDSCH transmission, first of all, performing logic AND for M' ACK/NACK corresponding to the same user and same codeword; then, according to the state composed by L bundled ACK/NACKs, 2-bit feedback information and channel index for actual transmission are determined by looking up the table, and using PUCCH Format 1b to transmit the 2-bit feedback information in the chose feedback channel. For single codeword PDSCH transmission, the feedback information and feedback channel for actual transmission are directly chosen according to L ACK/NACKs feedback state. It is shown as FIG. 2, actual feedback information is defined for 2 bits, therefore QPSK (Quadrature Phase-Shift Keying) modulation and PUCCH Format 1b transmission are needed. The method avoids unnecessary retransmission effectively, fitting for the cell center user, and improving transmission efficiency.

Whether the bundling or the multiplexing method, UE simply uses one PUCCH channel resource to send an ACK/NACK feedback information, and uplink single-carrier characteristic is maintained.

For dynamic scheduling downlink assignment, the usable uplink channel index for ACK/NACK feedback information is determined by the first CCE (Control Channel Element) index of the PDCCH (Physical Downlink Control Channel) used for transmitting the scheduling information corresponding to the assignment, namely, one uplink feedback channel resource index is uniquely determined according to the first CCE of the PDCCH. For bundling mode, supposing M' is the number of actually received downlink assignment, uplink control channel resource for actual transmission is indicated by the first CCE of the M' PDCCH in feedback window; for multiplexing mode, each PDCCH corresponding to a usable uplink channel resource index in the feedback window, and a channel resource for actual transmission is chose from all usable channels according to specific feedback state.

For the ACK/NACK feedback corresponding to downlink semi-persistent scheduling assignment, base station knows specific transmission time location for each information beforehand because they are periodically fed back, therefore, the channels used to transmit above control signal are beforehand configured to UE by base station through RRC signal (Radio Resource Control).

LTE-A system supports up to five carriers for aggregation right now. For carrier aggregation system, feedback window defines the multiple downlink carriers and downlink sub-frames which need to feedback ACK/NACK in the same sub-frame. For FDD system, the size of feedback window L equal to the number of UE aggregated downlink carriers. For TDD system, the size of feedback window L=N×M, therein, N is the number of UE aggregated downlink carriers, M is number of K in each row of table 1.

At present, in LTE-A (LTE-Advanced) system, for UE which configuring multiple transmission antennas, it can use ORTD (Orthogonal Resource Transmit Diversity) for uplink control channel to realize transmit diversity, and improving reliability or capacity of uplink control signaling transmission. The so-called ORTD is each antenna port corresponding to a PUCCH resource index, the same information is spread with the orthogonal sequences corresponding to the different antenna port, and is sent through corresponding antenna ports synchronously. Receiver side separates signal from different antenna ports and performs combination and detection, thereby, and gets diversity gain. FIG. 3 is a flow diagram which uses ORTD for transmit diversity through two antenna ports, therein, s is ACK/NACK feedback information, $n_1^{PUCCH}$ and $n_2^{PUCCH}$ denote the two different uplink control channel resource indexes for two antenna ports respectively, corresponding to different orthogonal spread sequence.

There are at least the following problems in the existing technology: in Long Term Evolution system, UE may use transmit diversity to transmit ACK/NACK information under multiplexing and bundling mode, it is need to use multiple uplink control resource indexes, there is no specific realization for the method of uplink control channel resource reservation and indication of uplink control resource index now.

SUMMARY OF THE PRESENT INVENTION

The embodiment of the present invention provides a method, system and apparatus for ACK/NACK resource reservation, using for realizing uplink control channel resource reservation.

The embodiment of the present invention provides a method for ACK/NACK resource reservation, comprising:

said user terminal needing two uplink control channel resources when using two antenna ports to transmit ACK/NACK for transmit diversity, each channel resource corresponding to a index, and each antenna port corresponding to a channel resource; therein, indication of usable channel resource index for the first antenna port is specifically meant for: for dynamic scheduling downlink assignment, each channel resource index binding with the index of first control channel unit CCE used by the physical downlink control channel PDCCH corresponding to each downlink assignment; for semi-persistent scheduling downlink assignment, said channel resource index being determined according to RRC signaling configured by said station.

Therein, said base station configuring usable uplink control channel resources to a user terminal using transmit diversity for ACK/NACK transmission, comprising:

said base station limiting the CCE aggregation level of all PDCCHs in feedback window for said user terminal at least to 2, and two channel resource indexes corresponding to two beforehand appointed CCEs of one PDCCH constituting a resource set;

therein, after said base station notified all said usable uplink control channel resources to said user terminal, further comprising:

said user terminal detecting PDCCH, and obtaining all usable channel resource sets according to two beforehand appointed CCEs of each PDCCH;

said user terminal receiving PDSCH, and getting L bits of ACK/NACK information after decoding, therein, L is the length of feedback window;

said user terminal obtaining feedback information and choosing a channel resource set from all usable channel resource sets for actual transmission, according to the state which constituted by said L bits of ACK/NACK, and two channel resource in the chosen set corresponding to two antenna ports respectively;

said user terminal transmitting said actual feedback information on two antenna ports synchronously using said two channel resources in the chosen set.

Therein, said base station receiving the ACK/NACK transmitted by the said user terminal on the configured channel resources, comprising:

said base station combining the signal on two physical uplink control channels PUCCHs in the same channel resource set, then performing detection on all channel resource sets, and obtaining one channel resource set which having data transmission;

said base station detecting the signal transmitted on said channel resource set which having data transmission, and getting specific actual feedback information;

said base station obtaining the ACK/NACK transmitted by said user terminal according to the actual feedback information and the channel resource index which having been detected.

Therein, said base station configuring usable uplink control channel resources to a user terminal using transmit diversity for ACK/NACK transmission, comprising:

said base station limiting the CCE aggregation level of at least one PDCCH in feedback window equal to 2 or greater than 2.

Therein, after said base station notified all said usable channel resources to said user terminal, further comprising:

said user terminal detecting PDCCH, obtaining all the usable channel resources for the first antenna port according to the indexes of the first CCE of all PDCCHs, and determining the channel resource for the second antenna port corresponding to the index of second CCE of a certain PDCCH with CCE aggregation level equal to 2 or greater than 2;

said user terminal receiving PDSCH, and getting L bits of ACK/NACK information after decoding, therein, L is the length of feedback window;

said user terminal obtaining feedback information and choosing one channel resource for the first antenna port from said all channel resources for the first antenna port for actual transmission, according to the state constituted by said L bits of ACK/NACK information;

said user terminal transmitting said feedback information on two antenna ports synchronously using said two channel resources for the first and second antenna ports respectively.

Therein, said base station receiving the ACK/NACK transmitted by the said user terminal on the configured channel resources, comprising:

said base station performing detection on all the channel resources corresponding to the first antenna port, and determining one channel resource which having data transmission; before said detection, said base station combining all the signal on the channel resource corresponding to the second CCE of all PDCCHs with CCE aggregation level≥2 with signal on the channel resource corresponding to the first CCE of each PDCCH in the feedback window;

said base station detecting the signal transmitted on channel resource which having data transmission, and getting the specific actual feedback information;

said base station obtaining the ACK/NACK transmitted by said user terminal according to the actual feedback information and the channel resource index which having been detected.

Therein, said base station configuring usable uplink control channel resources to a user terminal using transmit diversity for ACK/NACK transmission, comprising:

said base station configuring one channel resource for the second antenna port by higher layer signaling; said channel resource may be shared by multiple user terminals in one cell, and said base station limiting that the user terminals which share same channel resource feed back uplink information in different time by configuration.

Therein, after said base station notified all said usable uplink control channel resource to said user terminal, further comprising:

said user terminal obtaining channel resource index for the second antenna port by received higher layer signaling;

said user terminal detecting PDCCH, and getting all usable channel resources for the first antenna port according to the indexes of the first CCE of all PDCCHs;

said user terminal receiving PDSCH, getting L bits of ACK/NACK information after decoding, therein, L is the length of feedback window;

said user terminal obtaining feedback information and choosing one channel resource for the first antenna port from said all channel resources for the first antenna port for actual transmission, according to the state constituted by said L bits of ACK/NACK information;

said user terminal transmitting said actual feedback information on two antenna ports synchronously using said two channel resources for the first and second antenna ports respectively.

Therein, said base station receiving the ACK/NACK transmitted by the said user terminal on the configured channel resources, comprising:

said base station performing detection on all channel resources corresponding to the first antenna port, and determining the channel resource which having data transmission; before said detection, said base station combining the signal on beforehand configured channel resource for the second antenna port with signal on the channels corresponding to the first CCE of each PDCCH in the feedback window;

said base station detecting signal transmitted on channel resource which having data transmission, and getting the specific actual feedback information;

said base station obtaining the ACK/NACK transmitted by said user terminal according to the actual feedback information and the channel resource index which having been detected.

Therein, said base station configuring usable uplink control channel resources to a user terminal using transmit diversity for ACK/NACK transmission, comprising:

said base station limiting the CCE aggregation level of all PDCCHs in the feedback window at least to 2.

Therein, after said base station notified all said usable uplink control channel resources to said user terminal, further comprising:

said user terminal detecting PDCCH, and obtaining all usable channel resource indexes according to the indexes of the first and the second CCE of all PDCCHs; and choosing the channel resource indexes corresponding to the first and the second CCE of a PDCCH for the first and the second antenna port according to advance appointment;

said user terminal receiving PDSCH, getting M' bits of ACK/NACK information after decoding, and performing logic AND for M' bits of ACK/NACK corresponding to the same codeword, then obtaining 1 or 2 bit feedback information; therein, M' is the number of received downlink assignments;

said user terminal transmitting said feedback information synchronously on two antenna ports using two channel resources respectively, realizing transmit diversity.

Therein, said base station receiving the ACK/NACK transmitted by the said user terminal on the configured channel resources, comprising:

said base station performing detection on all usable channel resources in feedback window, and determining the channel resources which having data transmission; before said detection, said base station combining the signal on channel resources corresponding to the second and the first CCE of the same PDCCH in feedback window;

said base station detecting signal transmitted on channel resources which having data transmission, and getting the ACK/NACK that said user terminal feeding back.

Therein, said base station configuring usable uplink control channel resources to a user terminal using transmit diversity for ACK/NACK transmission, comprising:

said base station limiting that at least two usable CCEs exist in the feedback window, and each CCE binding with a usable uplink control channel resource; when the length of feedback window is 1, the CCE aggregation level of the sole PDCCH is at least 2.

Therein, after said base station notified all said usable uplink control channel resources to said user terminal, further comprising:

when said user terminal not receiving any CCE or receiving only one CCE, said user terminal not sending any feedback information or falling back to single antenna transmission mode;

when said user terminal receiving two or more than two CCEs:

said user terminal detecting PDCCH, determining all usable channel resource indexes in feedback window according to the indexes of the first CCE of all PDCCHs, and choosing two of them for two antenna ports according to advance appointment, when the length of the feedback window is greater than 1; said user terminal determining two channel resources for two antenna ports according to the first and the second CCE indexes of the sole PDCCH in feedback window, when length of feedback window is 1;

said user terminal receiving PDSCH, getting M' bits of ACK/NACK information after decoding, and performing logic AND for M' bits of ACK/NACK corresponding to the same codeword, then obtaining 1 or 2 bit feedback information; therein, M' is the number of received downlink assignments;

said user terminal transmitting feedback information synchronously on two antenna ports using two channel resources respectively, realizing transmit diversity.

Therein, said base station receiving the ACK/NACK transmitted by the said user terminal on the configured channel resources, comprising:

said base station performing detection on all usable channel resources in the feedback window, and determining the channel resources which having data transmission; if no signal is detected, assignment loss having been happened;

said base station detecting signal transmitted on the channel resources which having data transmission, getting the ACK/NACK transmitted by said user terminal.

Therein, said base station configuring usable uplink control channel resources to a user terminal using transmit diversity for ACK/NACK transmission, comprising:

said base station configuring one channel resource for the second antenna port by higher layer signaling; said channel resource may be shared by multiple user terminals in one cell, said base station limiting that the user terminals which share the same channel resource feed back the uplink information in different time by configuration.

Therein, after said base station notified all said usable uplink control channel resources to said user terminal, further comprising:

said user terminal obtaining the channel resource index for the second antenna port by received higher layer signaling;

said user terminal detecting PDCCH, obtaining all usable channel resource indexes for the first antenna port according to the indexes of the first CCE of all PDCCHs, and choosing one channel resource for the first antenna port according to advance appointment said user terminal receiving PDSCH, getting M' bits of ACK/NACK information after decoding, and performing logic AND for M' bits of ACK/NACK corresponding to the same codeword, then obtaining 1 or 2 bit feedback information; therein, M' is the number of received downlink assignments;

said user terminal transmitting actual feedback information on two antenna ports synchronously using two channel resources for the first and second antenna ports respectively, realizing transmit diversity.

Therein, said base station receiving the ACK/NACK transmitted by the said user terminal on the configured channel resources, comprising:

said base station performing detection on all usable channel resources in window, and determining the channel resources which having data transmission; before said detection, said base station combining the signal on the channel resource beforehand configured for the second antenna port with signal on the channel resource corresponding to the first CCE of each PDCCH;

said base station detecting signal transmitted on the channel resources which having data transmission, and getting the ACK/NACK transmitted by said user terminal.

The embodiment of the present invention also provides a system for ACK/NACK resource reservation, wherein, comprising:

base station, is used for configuring and notifying usable uplink control channel resources to a user terminal using transmit diversity for ACK/NACK transmission; receiving the ACK/NACK transmitted by the said user terminal on the configured channel resource set.

user terminal, is used for using the mode of ACK/NACK multiplexing with transmit diversity, or ACK/NACK bundling with transmit diversity to transmit ACK/NACK feedback information on the control channel resources configured by said base station.

The embodiment of the present invention also provides a base station, comprising:

configuration unit, is used for configuring and notifying usable uplink control channel resources to a user terminal using transmit diversity for ACK/NACK transmission;

transmission obtaining unit, is used for receiving the ACK/NACK transmitted by the said user terminal on the configured channel resources.

Therein, said configuration unit, is specifically used for said user terminal needing to two uplink control channel resources when using two antenna ports to transmit ACK/NACK for transmit diversity, each channel resource corresponding to a index, and each antenna port corresponding to a channel resource index; therein, indication of usable channel resource index for the first antenna port is specifically meant for: for dynamic scheduling downlink assignment, each channel resource index binding with the index of first control channel unit CCE used by the physical downlink control channel PDCCH corresponding to each downlink assignment; for semi-persistent scheduling downlink assignment, said usable channel resource index being determined according to RRC signaling configured by said station.

Therein, said configuration unit is specifically used for: limiting the CCE aggregation level of all PDCCHs in feedback window for said user terminal at least to 2, and two channel resource indexes corresponding to two CCEs of each PDCCH constituting a resource index set;

said transmission obtaining unit is specifically used for: combining the signal on the two PUCCHs in the same channel resource set, then performing detection on all usable channel resource sets, and obtaining the channel resource set which having data transmission; detecting the signal transmitted on the channel resource set which having data transmission, and getting specific actual feedback information; obtaining the ACK/NACK transmitted by said user terminal according to the actual feedback information and said channel resource index which having been detected.

Therein, said configuration unit is specifically used for: limiting the CCE aggregation level of at least one PDCCH equal to 2 or greater than 2 in the feedback window;

said transmission obtaining unit is specifically used for: performing detection on all channel resources corresponding to the first antenna port, and determining one channel resource which having data transmission; before said detection, combining all the signal on the channel resources corresponding to the second CCE of all PDCCHs with CCE aggregation level≥2 with signal on channel resource corresponding to the first CCE of each PDCCH in the feedback window; detecting signal transmitted on the channel resource which having data transmission, and getting specific actual feedback information; obtaining the ACK/NACK transmitted by said user terminal according to the actual feedback information and the channel resource index which having been detected.

Therein, said configuration unit is specifically used for: configuring one channel resource for the second antenna port by higher layer signaling; said channel resource may be shared by multiple user terminals in one cell, and said configuration unit limiting that user terminals which share the same channel resource feed back uplink information in different time by configuration;

said transmission obtaining unit is specifically used for: performing detection on all channel resources corresponding to the first antenna port, and determining the one channel resource which having data transmission; before said detection, combining the signal on beforehand configured channel resource for the second antenna port with signal on the channel resource corresponding to the first CCE of each PDCCH; detecting signal transmitted on channel resource which having data transmission, and getting the specific actual feedback information; obtaining ACK/NACK transmitted by said user terminal according to the actual feedback information and the channel resource index which having been detected.

Therein, said configuration unit is specifically used for: limiting CCE aggregation level of all PDCCHs in feedback window at least to 2;

said transmission obtaining unit is specifically used for: performing detection on all usable channel resources in the feedback window, and determining channel resources which having data transmission; before said detection, combining all the signal on channel resources corresponding to the second CCE of all PDCCHs with signal on channel resource corresponding to the first CCE of each PDCCH in feedback window; detecting the signal on the channel resources which having data transmission, and getting the ACK/NACK transmitted by said user terminal.

Therein, said configuration unit is specifically used for: limiting that at least two usable CCEs exist in the feedback window, each CCE binding with a usable uplink control channel resource; when the length of feedback window is 1, limiting the CCE aggregation level of the sole PDCCH in feedback window at least to 2;

said transmission obtaining unit is specifically used for: performing detection on all usable channel resources in the feedback window, and determining channel resources which having data transmission; if no signal is detected, assignment loss having been happened; detecting signal transmitted on the channel resources which having data transmission, and getting ACK/NACK transmitted by said user terminal.

Therein, said configuration unit is specifically used for: configuring one channel resource for the second antenna port by higher layer signaling; said channel resource may be shared by multiple user terminals in one cell, said configuration unit limiting that the user terminals which share the same channel resource feed back the uplink information in different time by configuration;

said transmission obtaining unit is specifically used for: performing detection on all usable channel resources in the feedback window, and determining the channel resource which having data transmission; before said detection, combining the signal on the channel resource beforehand configured for the second antenna port of said user terminal with the signal on the channel resource corresponding to the first CCE of each PDCCH; and detecting signal transmitted on the channel resources which having data transmission, and getting the ACK/NACK transmitted by said user terminal.

The embodiment of the present invention also provides a user terminal, comprising:

resource obtaining unit, is used for obtaining usable channel resources configured by base station for ACK/NACK transmission; and determining two channel resources used by two antenna ports respectively for actual transmission.

transmission unit, is used for using the mode of ACK/NACK multiplexing with transmit diversity, or ACK/NACK bundling with transmit diversity to transmit ACK/NACK feedback information on the two channel resources for actual transmission obtained from resource obtaining unit.

said resource obtaining unit is specifically used for: detecting PDCCH, and obtaining all usable channel resource sets according to two beforehand appointed CCEs of each PDCCH; receiving PDSCH, and getting L bits of ACK/NACK information after decoding, therein, L is the length of feedback window; obtaining feedback information and choosing a channel resource set from all said channel resource sets for actual transmission, according to the state which constituted by said L bits of ACK/NACK, and two channel resource in the chosen set corresponding to two antenna ports respectively;

said transmission unit is specifically used for, transmitting said actual feedback information on two antenna ports synchronously using two channel resources in the chosen set obtained from said resource obtaining unit.

Therein, said resource obtaining unit is specifically used for: detecting PDCCH, obtaining usable channel resources for the first antenna ports according to the indexes of the first CCE of all PDCCHs, and determining channel corresponding for the second antenna port corresponding to the index of second CCE of a certain PDCCH with CCE aggregation level equal to 2 or greater than 2; receiving PDSCH, and getting L bits of ACK/NACK information after decoding, therein, L is the length of feedback window; obtaining feedback information and choosing one channel resource for the first antenna port from said all channel resources for the first antenna port for actual transmission, according to the state constituted by said L bits of ACK/NACK information;

said transmission unit is specifically used for, transmitting said actual feedback information on two antenna ports synchronously using two channel resources in the chosen set obtained from said resource obtaining unit.

Therein, said resource obtaining unit is specifically used for: obtaining channel resource index for the second antenna port by received higher layer signaling; detecting PDCCH, and getting all channel resources for the first antenna port according to the indexes of the first CCE of all PDCCHs; receiving PDSCH, getting L bits of ACK/NACK information after decoding, therein, L is the length of feedback window; obtaining feedback information and choosing one channel resource for the first antenna port from said all channel resources for the first antenna port for actual transmission, according to the state constituted by said L bits of ACK/NACK information;

said transmission unit is specifically used for, transmitting said actual feedback information on two antenna ports synchronously using two channel resources in the chosen set obtained from said resource obtaining unit.

Therein, said resource obtaining unit is specifically used for: detecting PDCCH, and obtaining all usable channel resource indexes according to the indexes of the first and the second CCE of all PDCCHs; and choosing channel resource indexes corresponding to the first and the second CCE of a PDCCH for the first and the second antenna port according to advance appointment; receiving PDSCH, getting M' bits of ACK/NACK information after decoding, and performing logic AND for M' ACK/NACK corresponding to the same codeword, obtaining 1 or 2 bit feedback information; therein, M' is the number of received downlink assignments;

said transmission unit is specifically used for, transmitting said actual feedback information on two antenna ports synchronously using two channel resources in the chosen set obtained from said resource obtaining unit, realizing transmit diversity.

Therein, said resource obtaining unit is specifically used for: when said user terminal not receiving any CCE or receiving only one CCE, said user terminal not sending any feedback information or falling back to single antenna transmission mode; when said user terminal receiving two or more than two CCE: detecting PDCCH, determining all usable channel resource indexes in feedback window according to the indexes of the first CCE of all PDCCHs, and choosing two of them for two antenna ports according to advance appointment, when the length of the feedback window is greater than 1; determining two channel resources for two antenna ports according to the first and the second CCE indexes of the sole PDCCH in feedback window, when length of feedback window is 1; receiving PDSCH, getting M' bits of ACK/NACK information after decoding, and performing logic AND for M' bits of ACK/NACK corresponding to the same me codeword, then obtaining 1 or 2 bit feedback information; therein, M' is the number of received downlink assignments;

said transmission unit is specifically used for transmitting said actual feedback information on two antenna ports synchronously using two channel resources in the chosen set obtained from said resource obtaining unit, realizing transmit diversity.

Therein, said resource obtaining unit is specifically used for: obtaining the channel resource index for the second antenna port by received higher layer signaling; detecting PDCCH, and obtaining all usable channel resource indexes for the first antenna port according to the indexes of the first CCE of all PDCCHs, and choosing one channel resource for the first antenna port according to advance appointment; receiving PDSCH, getting M' ACK/NACK information after decoding, and performing logic AND for M' bits of ACK/NACK corresponding to the same codeword, then getting 1 or 2 bit feedback information; therein, M' is the number of received downlink assignments;

said transmission unit is specifically used for, transmitting said feedback information on two antenna ports synchronously using two channel resources in the chosen set obtained from said resource obtaining unit.

Comparing with existing technology, the embodiment of the present invention bears the following advantages:

The reservation of channel resource that is used in ACK/NACK feedback is realized, and the method for resource reservation supports transmit diversity, and improves the reliability of uplink control channel transmission; and the method is simple and easy to implement.

BRIEF DESCRIPTION OF THE DRAWINGS

In order to explain the technical program of the present invention more clearly, the following will describe the figures used in the embodiment, obviously, the figure in the following description is only some embodiments of this invention, for the technical personnel in this field, they can also get other figures according to these figures, on the premise of not paying creative labor.

DETAILED DESCRIPTION OF THE EMBODIMENTS OF THE PRESENT INVENTION

Embodiment of this invention will be clearly and completely described with pictures in the following. Apparently, the following embodiment is only a part of this invention, but not the whole invention. All the embodiments achieved by general technical personnel in this field based on this application without creative work belong to the protection scope of the present application.

The embodiment of the present invention provides a method of ACK/NACK resource reservation, reference to 4, comprising:

Step s401, base station configures and notifies usable uplink control channel resources to a user terminal uses transmit diversity for ACK/NACK transmission;

Step s402, base station receives the ACK/NACK transmitted by the user terminal on the configured uplink control channel resources.

In embodiment of the present invention, using ACK/NACK multiplexing with transmit diversity, or ACK/NACK bundling with transmit diversity, to improve reliability and coverage of transmission. If UE is configured to use diversity mode to transmit PUCCH, it is need at least two PUCCH channel resource indexes. The embodiment in following, taking an example of ORTD of two antenna ports to debate the way of channel resource index and reservation of multiplexing mode and bundling mode.

In embodiment of the present invention, for ACK/NACK multiplexing with transmit diversity mode, usable channel resource index corresponding to one of antenna port still uses Rel-8 indication, namely, for dynamic scheduling downlink assignment, usable uplink channel resource index binds with the index of the first CCE used by the PDCCH corresponding to dynamic scheduling downlink assignment, each downlink assignment corresponding to a usable uplink control channel resource in feedback window. For the ACK/NACK feedback corresponding to semi-persistent scheduling downlink assignment, usable uplink control channel determined according to RRC signaling configured by base station.

The embodiment of the present invention provides two indication ways for channel resource indication way of other antenna port, describing them respectively in following.

Figure 1:
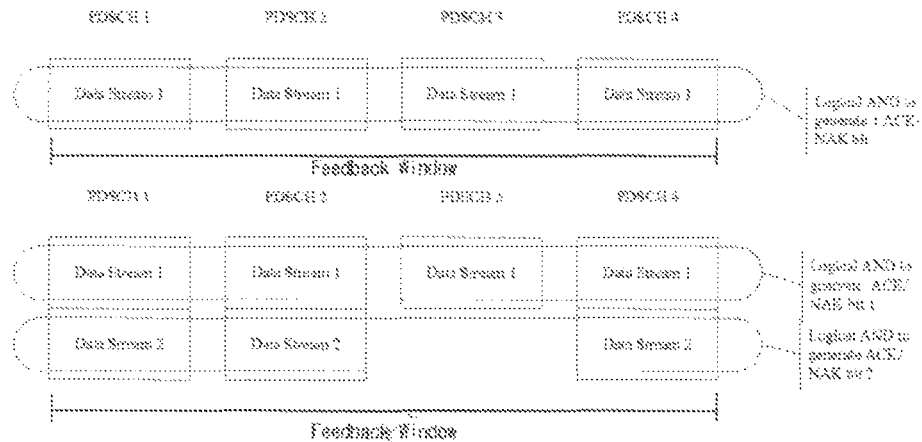
FIG. 1 is a diagram of ACK/NACK bundling in existing technology.
Figure 2:
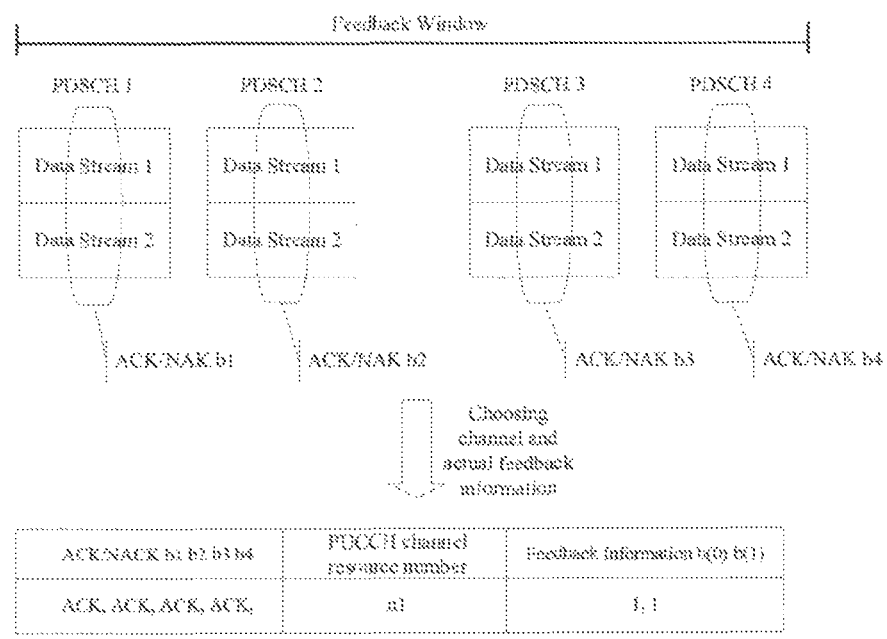
FIG. 2 is a diagram of ACK/NACK multiplexing in existing technology.
Figure 3:
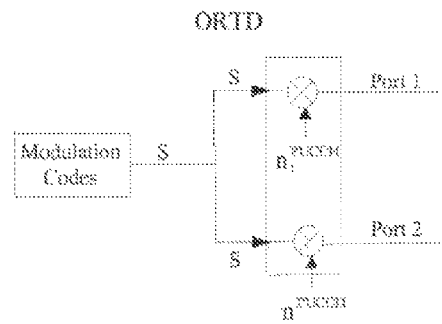
FIG. 3 is a diagram of two antenna ports transmit diversity in existing technology.
Figure 4:
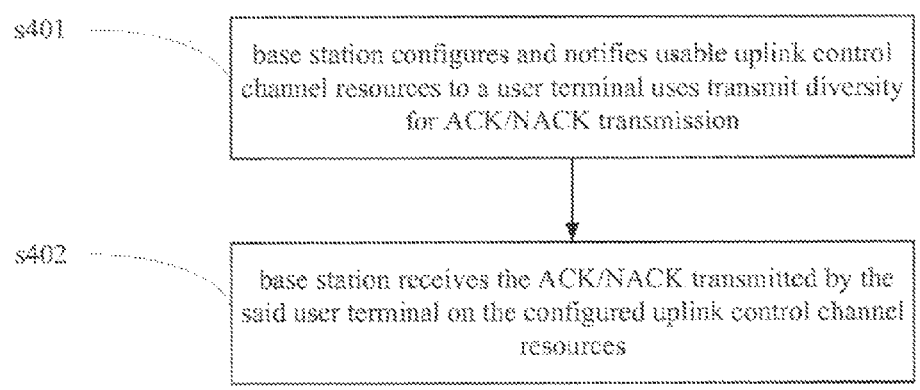
FIG. 4 is a flow diagram of ACK/NACK resource reservation method in embodiment of the present invention.
Figure 5:
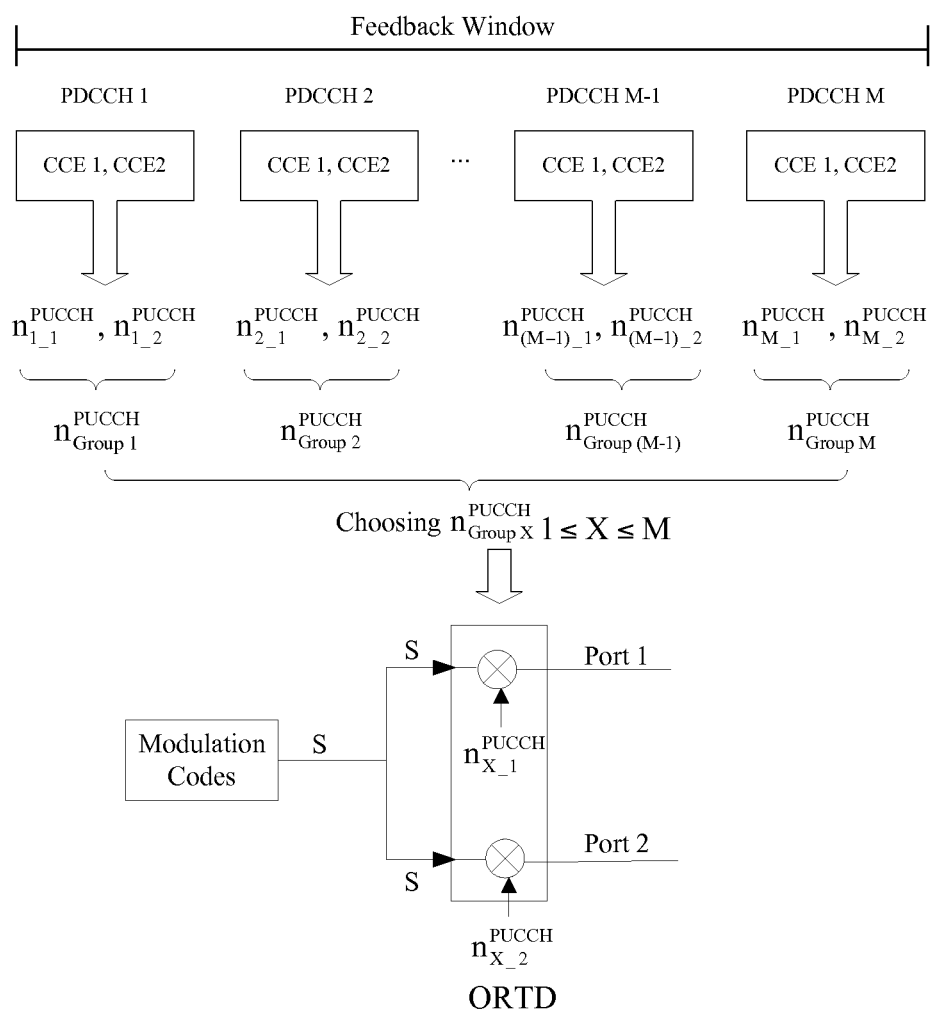
FIG. 5 is a diagram of CCE of PDCCH in feedback window of ACK/NACK multiplexing feedback mode in embodiment of the present invention.

Method 1:

The second channel resource index still binds with corresponding CCE index of PDCCH. It is need other CEE to index the PUCCH channel resource index which used for the second antenna port because the first CCE has bound with the first channel resource index at the moment. It would be divided two specific indication ways:

(The method 1 of indication): base station limits CCE aggregation level of all PDCCHs to greater than 2 or equal to 2 by scheduling in feedback window (CCE is basic unit that loads downlink control information DCI at PDCCH, the CCE aggregation level of PDCCH usually may be 1, 2, 4, 8 and so on); to determine each PDCCH corresponding to at least two usable uplink control channel resources in feedback window. Two channel resource indexes corresponding to two CCEs of each PDCCH beforehand appointed constitutes a resource index set; (considering CCE aggregation level, preferring channel resource index corresponding to the first and the second CCE of each PDCCH constitutes a resource index set), reference to FIG. 5. After channel resource set instead of channel resource of LTE Rel-8, continuing to use the method which Rel-8 defined to perform ACK/NACK multiplexing transmission. Reference to FIG. 4, supposing L is length of feedback window, UE chooses one set according to looking up the table way of Rel-8 in L channel resource set, two antenna ports which perform transmit diversity respectively use a channel resource of resource set to send actual feedback information.

Base station side processing course: base station limits CCE aggregation level of all PDCCHs of the UE equal to max (2, aggregation level determined by PDCCH detects reliability) by scheduling.

UE side processing course comprises:

Step 1, detecting PDCCH, obtaining all usable channel resource sets.

Step 2, receiving PDSCH, and getting L bits of ACK/NACK information after decoding, therein, L is the length of feedback window.

Step 3, UE determines actual feedback information of actual transmission and specific index of feedback channel set for transmission through looking up the table according to state which constituted by L bits of ACK/NACK. User terminal obtains feedback information and chooses a channel resource set from all usable channel resource sets for actual transmission, according to the state which constituted by said L bits of ACK/NACK, and two channel resource in the chosen set corresponding to two antenna ports respectively;

Step 4, UE transmits said feedback information on two antenna ports synchronously use said two channel resources in the chosen set.

Base station side receiving course comprises:

Step 1, detecting all usable channel resource sets, determining channel resource set which has data transmission, obtaining channel resource set index which has chosen. Combining the signal on two PUCCHs in same resource set before detecting.

Step 2, detecting the signal which transmits on channel resource set where has chosen, and getting specific actual feedback information.

Step 3, obtaining specific state of L bits ACK/NACK through looking up the table according to the actual feedback information and the channel resource index which have been detected.

(The method 1 of indication): base station limits the CCE aggregation level of at least one PDCCH equal to 2 or greater than 2 by scheduling in feedback window. UE makes a choice at channel resource corresponding to the first CCE of all PDCCHs in feedback window according to the method which Rel-8 defined, and determining channel resource which the first antenna port used and the feedback information which will be fed, and determining the channel resource for the second antenna port corresponding to the second CCE of a certain PDCCH (choosing the PDCCH with the first CCE aggregation level≥2 in window preferably). For example, reference to FIG. 6, the PDCCH which the first CCE aggregation level≥2 is PDCCH 2 in feedback window, choosing channel resource index which the first antenna port used between $n_{1\_1}^{PUCCH}$ and $n_{1\_M}^{PUCCH}$; the channel resource index which the second antenna port used is $n_{2\_2}^{PUCCH}$, it indexed by the second CCE of PDCCH 2. If the first PDCCH of CCE aggregation≥2 lost, UE automatically uses resource index corresponding to the second CCE in the second PDCCH of CCE aggregation≥2 (reference to FIG. 5, choosing $n_{3\_2}^{PUCCH}$ corresponding to CCE2 of PDCCH), and so on. If all PDCCH of aggregation level≥2 lost, UE falls back to single antenna transmission mode, using resource index corresponding to the first antenna port which chosen by channel choice to send actual feedback information at an antenna port. The present method saves PUCCH resource reservation farthest, and having a lesser limitation about CCE aggregation level of PDCCH.

Figure 6:
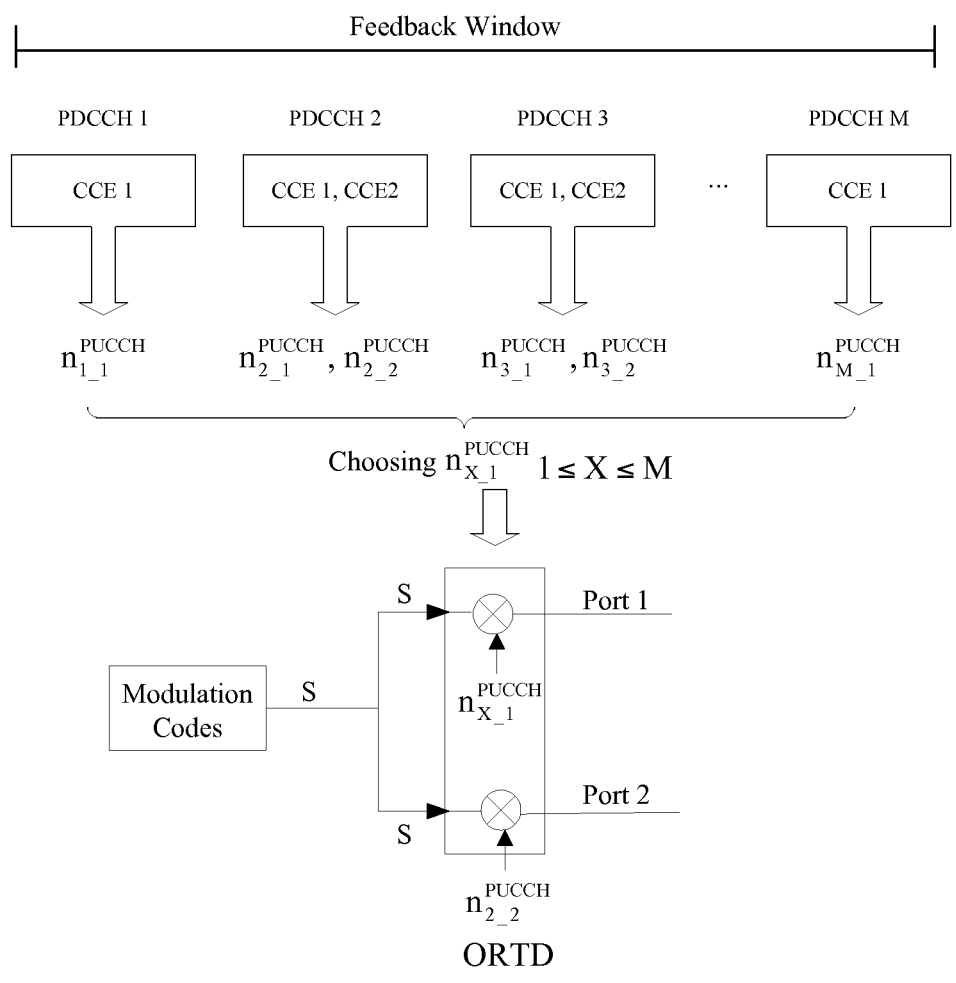
FIG. 6 is a diagram of CCE of PDCCH in feedback window of ACK/NACK multiplexing feedback mode in embodiment of the present invention.

Base station side processing course comprises:

If it can determine certain PDCCH with CCE aggregation level>1 corresponding to same UE in the feedback window through PDCCH detects reliability, base station needn't make other scheduling limitation; if it can determine PDCCH with CCE aggregation level less than 1 or equal to 1 corresponding to same UE in the feedback window through PDCCH detects reliability, base station need limit a PDCCH with CCE aggregation level=2 by scheduling. Reference to FIG. 6, the CCE aggregation level of PDCCH2 and PDCCH3 equal to 2, existing severally two CCE which bind with two resource index respectively; other PDCCH with CCE aggregation level equal to 1, the first CCE of each PDCCH binds with a usable uplink control resource index.

UE side processing course comprises:

Step 1, detecting PDCCH, and getting all usable channel resources for the first antenna port according to the indexes of the first CCE of all PDCCHs. And determining the channel resource for the second antenna port corresponding to the index of second CCE of a certain PDCCH with CCE aggregation level equal to 2 or greater than 2. Preferably, choosing the channel resource corresponding to the second CCE of the first PDCCH with CCE aggregation level≥2 which UE received for the resource that the second antenna port uses in the window.

Step 2, receiving PDSCH, and getting L bits of ACK/NACK information after decoding, therein, L is the length of feedback window.

Step 3, UE determines actual transmission feedback information through looking up the table and choosing a channel resource set from all said channel resource sets corresponding to the first antenna port for actual transmission, according to the state which constituted by L bits of ACK/NACK;

Step 4, UE transmits actual feedback information through two antenna ports synchronously on two antenna ports use two channel resources respectively.

Base station side receiving course comprises:

Step 1, detecting channel resource which the first antenna port used, determining the channel resource which has data transmission, obtaining channel resource index which has chosen. Otherwise, before said detection, said base station combines all the signal on the channel resource corresponding to the second CCE of all PDCCHs with CCE aggregation level≥2 with signal on the channel resource corresponding to the first CCE of each PDCCH in the feedback window.

Step 2, detecting signal transmitted on channel resource which has chosen, getting specific actual feedback information.

Step 3, getting specific state of L bits of ACK/NACK through looking up the table according to actual feedback information and the channel resource index which have been detected.

Method 2: network side distributes the second channel resource regularly:

Base station side processing course comprises:

when base station configures "ACK/NACK multiplexing with transmit diversity" mode to certain UE, base station will configure one usable uplink control channel to correspond the second antenna port regularly by higher layer signal. The uplink control channel may be shared by multiple users, base station limits that user terminals which share the same channel resource feed back uplink information in different time by scheduling.

UE side processing course comprises:

Step 1, obtaining channel index for the second antenna port according to RRC signal.

Step 2, detecting PDCCH, obtaining all usable channel resources for the first antenna port according to the indexes of the first CCE of all PDCCHs.

Step 3, receiving PDSCH, getting L bits of ACK/NACK information after decoding, therein, L is the length of feedback window.

Step 4, determining feedback information through looking up the table and choosing one channel resource for the first antenna port from said all channel resources for the first antenna port for actual transmission, according to the state constituted by said L bits of ACK/NACK information;

Step 5, transmitting actual feedback information on two antenna ports synchronously use two channel resources for the first and second antenna ports respectively.

Base station receiving course comprises:

Step 1, detecting channel resource which the first antenna port used, determining the channel resource which has data transmission, obtaining channel resource index which has chosen. Otherwise, before detection, said base station combines the signal on the channel resource beforehand configured for the second antenna port of the UE with signal on the channel resource corresponding to the first CCE of each PDCCH in the feedback window.

Step 2, detecting signal transmitted on channel resource which has chosen, getting specific actual feedback information.

Step 3, getting specific state of L bits of ACK/NACK through looking up the table according to actual feedback information and the channel resource index which has been detected.

For bundling and transmit diversity mode, a uplink control channel resource among uplink control channel resource corresponding to two antenna ports may use indication way of Rel-8 bundling mode, namely, when dynamic scheduling, to indicate by the first CCE of M' bits of PDCCH in feedback window; when semi-persistent scheduling, base station distributes usable uplink control channel for UE beforehand uses RRC signal. For the control channel resource of other antenna port, embodiment of the present invention also provides two indication ways in following:

Method 1:

The second channel resource index also combines with CCE index of PDCCH, dividing the method into two indication method:

(the method 1 of indication): base station limits CCE aggregation level of all PDCCHs of UE to greater than 2 or equal to 2 by scheduling in feedback window; to determine that each PDCCH corresponds at least two uplink control channel resource in feedback window.

Base station side processing course: base station limits CCE aggregation level of all PDCCHs of the UE equal to max (2, aggregation level determined by PDCCH detects reliability) by scheduling.

UE side processing course comprises:

Step 1, detecting PDCCH, and obtaining all usable channel resource indexes according to the indexes of the first and the second CCE of all PDCCHs; and choosing the channel resource indexes corresponding to the first and the second CCE of a PDCCH for the first and the second antenna port according to advance appointment; preferably, choosing the channel resource indexes corresponding to the first and the second CCE of M' bits of PDCCH (namely, the PDCCH corresponding to the last downlink assignment which UE actually received) for the first and the second antenna port according to advance appointment.

Step 2, receiving PDSCH, getting M' bits of ACK/NACK information after decoding, and performing logic AND for M' bits of ACK/NACK corresponding to the same codeword, then obtaining 1 or 2 bit feedback information.

Figure 7:
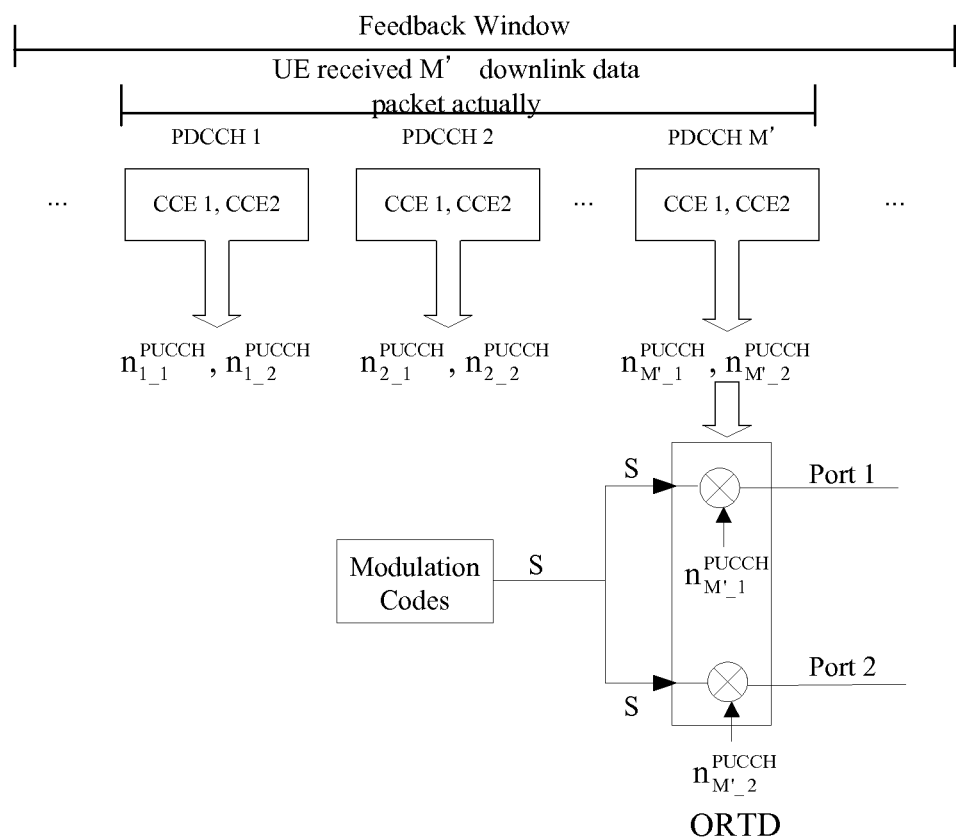
FIG. 7 is a diagram of CCE of PDCCH in feedback window of ACK/NACK bundling feedback mode in embodiment of the present invention.

Step 3, UE transmits said feedback information synchronously on two antenna ports use two channel resources respectively, realizing transmission diversity, reference to FIG. 7.

Base station receiving course comprises:

Step 1, detecting all usable channel resources in window, determining channel resource which has data transmission. Otherwise, before said detection, combining the signal on channel resources corresponding to the second and the first CCE of the same PDCCH in window.

Step 2, detecting signal transmitted on channel resource which has detected, getting specific feedback information.

(the method 2 of indication): base station limits that exists at least two usable CCE in feedback window, each CCE combines with a usable uplink control channel resource.

Base station side processing course: dividing the course into two cases:

Case 1: L=1: there is only one PDCCH in feedback window right now, base station limits the CCE aggregation level of the PDCCH equal to max (2, aggregation level determined by PDCCH detects reliability).

Case 2: L>1: base station doesn't limit CCE aggregation level of PDCCH in feedback window, because there are at least two usable CCE at feedback window.

UE side processing course: dividing into two cases:

Case 1: UE not receives any CCE or receives only one CCE, UE can judge that loses downlink assignment necessarily, UE not sends any feedback information (namely, DTX state) or falls back to single antenna transmission mode.

Figure 8:
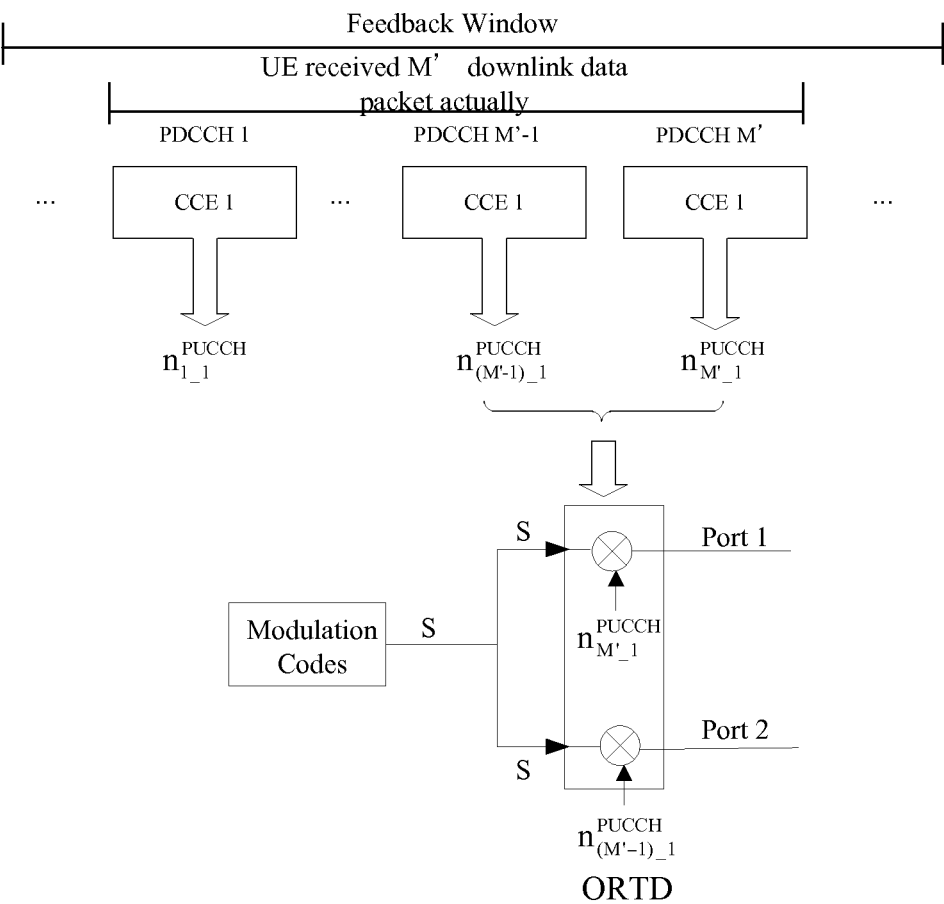
FIG. 8 is a diagram of CCE of PDCCH in feedback window of ACK/NACK bundling feedback mode in embodiment of the present invention.

Case 2: UE receives two or more than two CCE. Specific processing course of UE comprises:

Step 1, UE detects PDCCH, determining all usable channel resource indexes in feedback window according to the indexes of the first CCE of all PDCCHs, and choosing two of them for two antenna ports according to advance appointment, when the length of the feedback window is greater than 1. Considering the compatibility with Rel-8, choosing the index corresponding to the first CCE of M' bits of PDCCH and the index corresponding to neighboring CCE preferably, reference to FIG. 8; UE determines two channel resources for two antenna ports according to the first and the second CCE indexes of the sole PDCCH in feedback window, when length of feedback window is 1.

Step 2, receiving PDSCH, getting M' bits of ACK/NACK information after decoding, and performing logic AND for M' bits of ACK/NACK corresponding to the same codeword, then obtaining 1 or 2 bit (downlink double codeword) feedback information.

Step 3, UE transmits feedback information synchronously on two antenna ports use two channel resources respectively, realizing transmit diversity.

Base station side receiving course comprises:

Step 1, performing detection on all channel resources in the feedback window, and determining the channel resources which has data transmission; if no signal is detected, therein DTX, assignment loss has been happened;

Step 2, detecting signal which transmits at detected channel resource, getting specific feedback information.

Method 2: network side distributes the second channel resource regularly:

Base station side processing course comprises: when base station configures "ACK/NACK bundling with transmit diversity" mode to certain UE, base station will configure one usable uplink control channel by higher layer signal, corresponding the second antenna port. The uplink control channel may be shared by multiple users, base station limits that user terminals which share the same channel resource feed back uplink information in different time by scheduling.

UE side processing course comprises:

Step 1, obtaining channel index which uses for the second antenna port according to RRC signal.

Step 2, detecting PDCCH, obtaining all channel resource indexes for the first antenna port according to the indexes of the first CCE of all PDCCHs, and choosing one channel resource for the first antenna port according to advance appointment, choosing channel resource index corresponding to the first CCE of M' bits of PDCCH preferably.

Step 3, receiving PDSCH, getting M' bits of ACK/NACK information after decoding, and performing logic AND for M' bits of ACK/NACK corresponding to the same codeword, then obtaining 1 or 2 bit (downlink double codeword) feedback information.

Step 4, transmitting actual feedback information on two antenna ports synchronously uses two channel resources for the first and second antenna ports respectively, realizing transmit diversity.

Base station receiving course comprises:

Step 1, performing detection on all channel resources in window, and determining the channel resources which have data transmission; otherwise, before said detection, said base station combines the signal on the channel resource beforehand configured for the second antenna port with signal on the channel resource corresponding to the first CCE of each PDCCH.

Step 2, detecting signal transmitted on the channel resources which has data transmission, and getting the specific feedback information.

The reservation of channel resource that is used in ACK/NACK feedback is realized through the method and apparatus which embodiment of the present invention provides, and the method for resource reservation supports transmission diversity, and improves the reliability of uplink control channel transmission; and the method is simple and easy to implement, applying to FDD and TDD system, possessing good compatibility with Rel-8 system.

The embodiment of the present invention also provides a system for ACK/NACK resource reservation, comprising:

base station, configuring and notifying usable uplink control channel resources to a user terminal uses transmit diversity for ACK/NACK transmission; receiving the ACK/NACK transmitted by the said user terminal on the configured channel resource set.

user terminal, is used for using the mode of ACK/NACK multiplexing with transmit diversity, or ACK/NACK bundling with transmit diversity to transmit ACK/NACK feedback information on the control channel resources configured by said base station.

Figure 9:
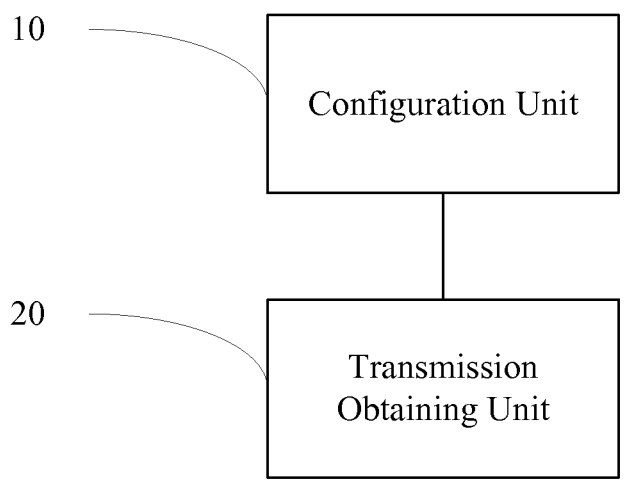
FIG. 9 is a diagram of base station in embodiment of the present invention.

Specifically, reference to FIG. 9, it is structure diagram of base station in the embodiment of the present invention, comprising:

configuration unit 10, is used for configuring and notifying usable uplink control channel resources to a user terminal using transmit diversity for ACK/NACK transmission;

transmission obtaining unit 20, is used for receiving the ACK/NACK transmitted by the said user terminal on the configured channel resources.

Therein, configuration unit 10 is specifically used for said user terminal needing to two uplink control channel resources when using two antenna ports to transmit ACK/NACK for transmit diversity, each channel resource corresponding to a index, and each antenna port corresponding to a channel resource; therein, indication of usable channel resource index for the first antenna port is specifically meant for: for dynamic scheduling downlink assignment, each channel resource index binding with the index of the first CCE used by the physical downlink control channel PDCCH corresponding to each downlink assignment, namely, each downlink assignment corresponding to a usable uplink control channel resource in feedback window; for semi-persistent scheduling downlink assignment, usable channel resource index being determined according to RRC signaling configured by said station.

On the indication way of channel resource index of the second channel resource:

In an optional embodiment:

configuration unit 10 is specifically used for: limiting the CCE aggregation level of all PDCCHs in feedback window for said user terminal at least to 2, and two channel resource indexes corresponding to two CCEs of each PDCCH constituting a resource index set (considering CCE aggregation level, preferring channel resource index corresponding to the first and the second CCE of each PDCCH constitutes a resource index set);

transmission obtaining unit 20 is specifically used for: combining the signal on the two PUCCH in the same channel resource set, then performing detection on all usable channel resource sets, and obtaining the channel resource set which having data transmission; detecting the signal transmitted on the channel resource set which having data transmission, and getting specific actual feedback information; obtaining the ACK/NACK transmitted by said user terminal according to the feedback information and the channel resource set for actual transmission which have detected.

In other optional embodiment:

configuration unit 10 is specifically used for: limiting the CCE aggregation level of at least one PDCCH equal to 2 or greater than 2 in the feedback window;

transmission obtaining unit 20 is specifically used for: performing detection on all channel resources corresponding to the first antenna port, and determining one channel resource which having data transmission; before said detection, combining all the signal on the channel resources corresponding to the second CCE of all PDCCHs with CCE aggregation level≥2 with signal on channel resource corresponding to the first CCE of each PDCCH in the feedback window; detecting signal transmitted on the channel resource which having data transmission, and getting specific actual feedback information; obtaining the ACK/NACK transmitted by said user terminal according to the actual feedback information and the channel resource index which having been detected.

In other optional embodiment:

configuration unit 10 is specifically used for: configuring one channel resource for the second antenna port by higher layer signaling; said channel resource may be shared by multiple user terminals in one cell, and said configuration unit 10 limiting that user terminals which share the same channel resource feed back uplink information in different time by configuration;

transmission obtaining unit 20 is used specifically for: performing detection on all channel resources corresponding to the first antenna port, and determining the one channel resource which having data transmission; before said detection, combining the signal on beforehand configured channel resource for the second antenna port with signal on the channel resource corresponding to the first CCE of each PDCCH; detecting signal transmitted on channel resource which having data transmission, and getting the specific actual feedback information; obtaining ACK/NACK transmitted by said user terminal according to the actual feedback information and the channel resource index which having been detected.

In other optional embodiment:

configuration unit 10 is specifically used for: limiting the CCE aggregation level of all PDCCHs in feedback window at least to 2;

transmission obtaining unit 20 is specifically used for: performing detection on all usable channel resources in the feedback window, and determining channel resources which having data transmission; before said detection, combining all the signal on channel resources corresponding to the second CCE of all PDCCHs with signal on channel resource corresponding to the first CCE of each PDCCH in feedback window; detecting the signal on the channel resources which having data transmission, and getting the ACK/NACK transmitted by said user terminal.

In other optional embodiment:

configuration unit 10 is specifically used for: limiting that at least two usable CCEs exist in the feedback window; when the length of feedback window is 1, limiting the CCE aggregation level of the sole PDCCH in feedback window at least to 2;

transmission obtaining unit 20 is specifically used for: performing detection on all usable channel resources in the feedback window, and determining channel resources which having data transmission; if no signal is detected, assignment loss having been happened; detecting signal transmitted on the channel resources which having data transmission, and getting ACK/NACK transmitted by said user terminal.

In other optional embodiment:

configuration unit 10 is specifically used for: configuring one channel resource for the second antenna port by higher layer signaling; said channel resource may be shared by multiple user terminals in one cell, said configuration unit limiting that the user terminals which share the same channel resource feed back the uplink information in different time by configuration;

transmission obtaining unit 20 is specifically used for: performing detection on all usable channel resources in the feedback window, and determining the channel resource which having data transmission; before detection, combining the signal on the channel resource beforehand configured for the second antenna port of said user terminal with the signal on the channel resource corresponding to the first CCE of each PDCCH; and detecting signal transmitted on the channel resources which having data transmission, and getting the ACK/NACK transmitted by said user terminal.

Figure 10:
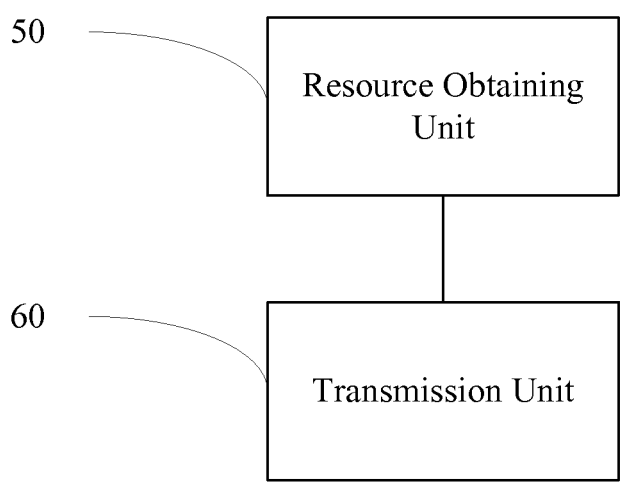
FIG. 10 is a structure diagram of user terminal in embodiment of the present invention.

The embodiment of the present invention provides a user terminal, reference to FIG. 10, comprising:

resource obtaining unit 50, is used for obtaining usable channel resources configured by base station for ACK/NACK transmission; and determining two channel resources used by two antenna ports respectively for actual transmission.

transmission unit 60, is used for using the mode of ACK/NACK multiplexing with transmit diversity, or ACK/NACK bundling with transmit diversity to transmit ACK/NACK feedback information on the two channel resources for actual transmission obtained from resource obtaining unit.

In an optional embodiment, resource obtaining unit 50 is specifically used for: detecting PDCCH, and obtaining all usable channel resource sets according to two beforehand appointed CCEs of each PDCCH; receiving PDSCH, and getting L bits of ACK/NACK information after decoding, therein, L is the length of feedback window; obtaining feedback information and choosing a channel resource set from all usable channel resource sets for actual transmission, according to the state which constituted by said L bits of ACK/NACK, and two channel resource in the chosen set corresponding to two antenna ports respectively;

transmission unit 60 is specifically used for, transmitting said actual feedback information on two antenna ports synchronously using two channel resources in the chosen set obtained from said resource obtaining unit 50.

In an optional embodiment, resource obtaining unit 50 is specifically used for: detecting PDCCH, obtaining usable channel resources for the first antenna ports according to the indexes of the first CCE of all PDCCHs, and determining channel corresponding for the second antenna port corresponding to the index of second CCE of a certain PDCCH with CCE aggregation level equal to 2 or greater than 2. Preferably, choosing the channel resource corresponding to the second CCE of PDCCH of CCE aggregation level≥2 as resource which used by the second antenna port; receiving PDSCH, and getting L bits of ACK/NACK information after decoding, therein, L is the length of feedback window; obtaining feedback information and choosing one channel resource for the first antenna port from said all channel resources for the first antenna port for actual transmission, according to the state constituted by said L bits of ACK/NACK information;

transmission unit 60 is specifically used for, transmitting said actual feedback information on two antenna ports synchronously using two channel resources in the chosen set obtained from said resource obtaining unit 50.

In an optional embodiment, resource obtaining unit 50 is specifically used for: obtaining channel resource index for the second antenna port by received higher layer signaling; detecting PDCCH, and getting all channel resources for the first antenna port according to the indexes of the first CCE of all PDCCHs; receiving PDSCH, getting L bits of ACK/NACK information after decoding, therein, L is the length of feedback window; obtaining feedback information and choosing one channel resource for the first antenna port from said all channel resources for the first antenna port for actual transmission, according to the state constituted by said L bits of ACK/NACK information;

feedback unit 60 is specifically used for, transmitting actual feedback information on two antenna ports synchronously using two channel resources in the chosen set obtained from said resource obtaining unit 50.

In an optional embodiment, resource obtaining unit 50 is specifically used for: detecting PDCCH, and obtaining all usable channel resource indexes according to the indexes of the first and the second CCE of all PDCCHs; and choosing channel resource indexes corresponding to the first and the second CCE of a PDCCH for the first and the second antenna port according to advance appointment; preferably, choosing channel resource index corresponding to the first and the second CCE of the M' bits of PDCCH (namely, the PDCCH corresponding to the last downlink assignment which UE actually received) as channel resource which being used by the first and the second antenna port; receiving PDSCH, getting M' bits of ACK/NACK information after decoding, and performing logic AND for M' ACK/NACK corresponding to the same codeword, obtaining 1 or 2 bit feedback information; therein, M' is the number of received downlink assignments;

transmission unit 60 is specifically used for, transmitting said actual feedback information on two antenna ports synchronously using two channel resources in the chosen set obtained from said resource obtaining unit 50, realizing transmit diversity.

In an optional embodiment, resource obtaining unit 50 is specifically used for: when said user terminal not receiving any CCE or receiving only one CCE, said user terminal not sending any feedback information or falling back to single antenna transmission mode; when said user terminal receiving two or more than two CCE: detecting PDCCH, determining all usable channel resource indexes in feedback window according to the indexes of the first CCE of all PDCCHs, and choosing two of them for two antenna ports according to advance appointment, when the length of the feedback window is greater than 1; considering the compatibility with Rel-8, choosing the index corresponding to the first CCE of M' bits of PDCCH and the index corresponding to neighboring CCE preferably; determining two channel resources for two antenna ports according to the first and the second CCE indexes of the sole PDCCH in feedback window, when length of feedback window is 1; receiving PDSCH, getting M' bits of ACK/NACK information after decoding, and performing logic AND for M' bits of ACK/NACK corresponding to the same me codeword, then obtaining 1 or 2 bit feedback information; therein, M' is the number of received downlink assignments;

transmission unit 60 is specifically used for, transmitting said actual feedback information on two antenna ports synchronously using two channel resources in the chosen set obtained from said resource obtaining unit 50, realizing transmit diversity.

In an optional embodiment, resource obtaining unit 50 is specifically used for: obtaining the channel resource index for the second antenna port by received higher layer signaling; detecting PDCCH, and obtaining all usable channel resource indexes for the first antenna port according to the indexes of the first CCE of all PDCCHs, and choosing one channel resource for the first antenna port according to advance appointment; receiving PDSCH, getting M' ACK/NACK information after decoding, and performing logic AND for M' bits of ACK/NACK corresponding to the same codeword, then getting 1 or 2 bit feedback information; therein, M' is the number of received downlink assignments;

transmission unit 60 is specifically used for, transmitting said actual feedback information on two antenna ports synchronously using two channel resources in the chosen set obtained from resource obtaining unit 50.

The reservation of channel resource that is used in ACK/NACK feedback is realized through the method and apparatus which embodiment of the present invention provides, and the method for resource reservation supports transmit diversity, and improves the reliability of uplink control channel transmission; and the method is simple and easy to implement, applying to FDD and TDD system, possessing good compatibility with Rel-8 system.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, including a number of instructions for making a computer device (such as mobile phone, personal computers, servers, or network equipments, etc.) implement the methods described in the embodiments of the present invention.

The technical personnel in this field can understand that drawing is diagram of only one embodiment, the unit or process of drawing is not necessarily for implementing the present invention.

The technical personnel in this field can understand the units of the devices in the embodiments can be set in the devices according to the description of the embodiments, also can be set in one or more devices different from the embodiments. Units in the above-mentioned embodiments can be integrated in one entirety, also can be deployed separately, can be combined into one module, also can be further split into multiple sub-modules.

Serial numbers of the above-mentioned embodiments of the present invention are only used for description, it does not express whether the embodiment is excellent or poor.

The invention claimed is:

1. A method for ACK/NACK resource reservation, comprising:
    obtaining, by a user terminal, usable uplink control channel resources configured by a base station for ACK/NACK transmission with transmit diversity; and determining two channel resources used by two antenna ports respectively for actual transmission; and
    using, by the user terminal, a mode of ACK/NACK multiplexing with transmit diversity, or ACK/NACK bundling with transmit diversity to transmit ACK/NACK feedback information on the two channel resources for actual transmission,
    the method further comprising:
        detecting, by the user terminal, one or more Physical Downlink Control Channels (PDCCHs), and obtaining all usable channel resource sets according to two predetermined Control Channel Elements (CCEs) of each PDCCH;
        receiving, by the user terminal, one or more Physical Downlink Shared Channels PDSCHs, and getting L bits of ACK/NACK information after decoding, where L is a length of feedback window;
        obtaining, by the user terminal, feedback information and choosing a channel resource set from all usable channel resource sets for actual transmission, according to a state which is constituted by the L bits of ACK/NACK, and wherein two channel resources in the chosen set correspond to two antenna ports respectively; and
        transmitting, by the user terminal, actual feedback information on the two antenna ports synchronously using the two channel resources in the chosen set, or
    the method further comprising:
        obtaining, by the user terminal, channel resource index for a second antenna port of the two antenna ports by received higher layer signaling;
        detecting, by the user terminal, one or more PDCCHs, and getting all usable channel resources for a first antenna port of the two antenna ports according to indexes of a first CCE of all PDCCHs;

receiving, by the user terminal, one or more PDSCHs, getting L bits of ACK/NACK information after decoding, where L is a length of feedback window;

obtaining feedback information and choosing one channel resource for the first antenna port of the two antenna ports from all channel resources for the first antenna port for actual transmission, according to a state constituted by the L bits of ACK/NACK information; and transmitting, by the user terminal, actual feedback information on the first and second antenna ports synchronously using two channel resources for the first and second antenna ports respectively, or the method further comprising:

detecting, by the user terminal, one or more PDCCHs, and obtaining all usable channel resource indexes according to indexes of a first and a second CCEs of all PDCCHs; and choosing channel resource indexes corresponding to the first and the second CCEs of a PDCCH for a first and a second antenna ports of the two antenna ports according to a predetermined arrangement;

receiving, by the user terminal, one or more PDSCHs, getting Md bits of ACK/NACK information after decoding, and performing logic AND for Md bits of ACK/NACK corresponding to a same codeword, then obtaining 1 or 2 bits feedback information; where Md is the number of received downlink assignments; and transmitting, by the user terminal, the feedback information synchronously on the two antenna ports using two channel resources respectively, so as to realize the transmit diversity, or the method further comprising:

obtaining, by the user terminal, a channel resource index for a second antenna port of the two antenna ports by received higher layer signaling;

detecting, by the user terminal, one or more PDCCHs, obtaining all usable channel resource indexes for a first antenna port of the two antenna ports according to indexes of a first CCE of all PDCCHs, and choosing one channel resource for the first antenna port according to a predetermined arrangement;

receiving, by the user terminal, one or more PDSCHs, getting Md bits of ACK/NACK information after decoding, and performing logic AND for Md bits of ACK/NACK corresponding to a same codeword, then obtaining 1 or 2 bits feedback information; where Md is the number of received downlink assignments; and transmitting, by the user terminal, actual feedback information on two antenna ports synchronously using two channel resources for the first and second antenna ports respectively, so as to realize the transmit diversity.

2. A method for ACK/NACK resource reservation, comprising:

configuring and notifying, by a base station, usable uplink control channel resources to a user terminal using transmit diversity for ACK/NACK transmission; and receiving the ACK/NACK transmitted by the user terminal on the configured uplink control channel resources, wherein the configuring, by the base station, usable uplink control channel resources to a user terminal using transmit diversity for ACK/NACK transmission comprises:

limiting, by the base station, a Control Channel Element (CCE) aggregation level of all Physical Downlink Control Channels (PDCCHs) in feedback window for the user terminal at least to 2, wherein two channel resource indexes corresponding to two predetermined CCEs of one PDCCH constitute a resource index set; and wherein the receiving, by the base station, the ACK/NACK transmitted by the user terminal on the configured uplink control channel resources comprises:

combining, by the base station, signals on two Physical Uplink Control Channels (PUCCHs) in a same channel resource set, then performing detection on all usable channel resource sets, and obtaining one channel resource set which has data transmission;

detecting, by the base station, the signal transmitted on the channel resource set which has data transmission, and getting specific actual feedback information; and obtaining, by the base station, the ACK/NACK transmitted by the user terminal according to the specific actual feedback information and a channel resource index which has been detected, or wherein the configuring, by the base station, usable uplink control channel resources to a user terminal using transmit diversity for ACK/NACK transmission comprises:

configuring, by the base station, one channel resource for a second antenna port of the two antenna ports by higher layer signaling; wherein the channel resource is shared by multiple user terminals in one cell, and the base station enables the user terminals which share the same channel resource to feed back uplink information in different time by configuration; and wherein the receiving, by the base station, the ACK/NACK transmitted by the user terminal on the configured channel resources comprises:

performing, by the base station, detection on all channel resources corresponding to a first antenna port of the two antenna ports, and determining a channel resource which has data transmission; wherein before the detection, the base station combines signals on beforehand configured channel resource for the second antenna port with signals on the channels corresponding to a first CCE of each PDCCH in a feedback window;

detecting, by the base station, signals transmitted on a channel resource which has data transmission, and getting a specific actual feedback information; and obtaining, by the base station, the ACK/NACK transmitted by the user terminal according to the specific actual feedback information and a channel resource index which has been detected, or wherein the configuring, by a base station, usable uplink control channel resources to a user terminal using transmit diversity for ACK/NACK transmission comprises:

limiting, by the base station, a CCE aggregation level of all PDCCHs in a feedback window at least to 2; and wherein the receiving, by the base station, the ACK/NACK transmitted by the user terminal on the configured channel resources comprises:

performing, by the base station, detection on all usable channel resources in the feedback window, and determining channel resources which have data transmission; wherein before the detection, the base station combines signals on channel resources corresponding to a second and a first CCEs of a same PDCCH in the feedback window; and detecting, by the base station, signals transmitted on channel resources which has data transmission, and getting the ACK/NACK transmitted by the user terminal, or wherein the configuring, by the base station, usable uplink control channel resources to a user terminal using transmit diversity for ACK/NACK transmission comprises:

configuring, by the base station, one channel resource for a second antenna port by higher layer signaling; wherein the channel resource is shared by multiple user terminals in one cell, the base station enables the user terminals which share same channel resources to feed back uplink information in different time by configuration; and the receiving, by the base station, the ACK/NACK transmitted by the user terminal on the configured channel resources comprises:

performing, by the base station, detection on all usable channel resources in the feedback window, and determining channel resources which have data transmission; wherein before the detection, the base station combines signals on the channel resource beforehand configured for the second antenna port with signals on the channel resource corresponding to the first CCE of each PDCCH; and detecting, by the base station, signals transmitted on the channel resources which have data transmission, and getting the ACK/NACK transmitted by the user terminal.

3. A base station, comprising:

a processor;

a hardware memory, which is connected with the processor via a bus interface and is configured to store program and data used for the processor;

a transceiver, which is configured to communicate with other devices through transmission media, when the processor calls and executes the program and data stored in the hardware memory, the base station executes the following processing:

configure and notify usable uplink control channel resources to a user terminal using transmit diversity for ACK/NACK transmission; and receive the ACK/NACK transmitted by the user terminal on the configured channel resources, wherein the base station is configured to:

limit a Control Channel Element CCE aggregation level of all Physical Downlink Control Channels (PDCCHs) in a feedback window for the user terminal at least to 2, wherein two channel resource indexes corresponding to two CCEs of each PDCCH constitute a resource index set; and combine signals on two Physical Uplink Control Channels (PUCCHs) in a same channel resource set, then perform detection on all usable channel resource sets, and obtain one channel resource set which has data transmission; detect the signal transmitted on the channel resource set which has data transmission, and get specific actual feedback information; obtain the ACK/NACK transmitted by the user terminal according to the specific actual feedback information and a channel resource index which has been detected, or wherein the base station is configured to:

configure one channel resource for a second antenna port of the two antenna ports by higher layer signaling; wherein the channel resource is shared by multiple user terminals in one cell, and the base station enables the user terminals which share the same channel resource to feed back uplink information in different time by configuration; and perform detection on all channel resources corresponding to a first antenna port of the two antenna ports, and determine a channel resource which has data transmission; wherein before said detection, the base station combines signals on beforehand configured channel resource for the second antenna port with signals on the channel resource corresponding to a first CCE of each PDCCH; detect signals transmitted on a channel resource which has data transmission, and get a specific actual feedback information; obtain the ACK/NACK transmitted by the user terminal according to the specific actual feedback information and a channel resource index which has been detected, or wherein the base station is configured to:

limit a CCE aggregation level of all PDCCHs in a feedback window at least to 2; and perform detection on all usable channel resources in the feedback window, and determine channel resources which have data transmission; wherein before the detection, the base station combines signals on channel resources corresponding to the second CCE of all PDCCHs with signal on channel resource corresponding to the first CCE of each PDCCH in feedback window; detecting the signal on the channel resources which have data transmission, and get the ACK/NACK transmitted by the user terminal, or wherein the base station is configured to:

configure one channel resource for a second antenna port by higher layer signaling; wherein the channel resource is shared by multiple user terminals in one cell, the base station enables the user terminals which share same channel resources to feed back uplink information in different time by configuration; and perform detection on all usable channel resources in the feedback window, and determine channel resources which have data transmission; wherein before the detection, the base station combines signals on the channel resource beforehand configured for the second antenna port of the user terminal with signals on the channel resource corresponding to the first CCE of each PDCCH; and detect signals transmitted on the channel resources which have data transmission, and get the ACK/NACK transmitted by the user terminal.

4. A user terminal, comprising:

a processor;

a hardware memory, which is connected with the processor via a bus interface and is configured to store program and data used for the processor;

a transceiver, which is configured to communicate with other devices through transmission media, when the processor calls and executes the program and data stored in the hardware memory, the user terminal executes the following processing:

obtain usable channel resources configured by base station for ACK/NACK transmission; and determine two channel resources used by two antenna ports respectively for actual transmission; and use a mode of ACK/NACK multiplexing with transmit diversity, or ACK/NACK bundling with transmit diversity to transmit ACK/NACK feedback information on the two channel resources for actual transmission, wherein the user terminal is configured to:

detect one or more Physical Downlink Control Channels (PDCCHs), and obtain all usable channel resource sets according to two predetermined Control Channel Elements (CCEs) of each PDCCH; receive one or more Physical Downlink Shared Channels PDSCHs, and get L bits of ACK/NACK information after decoding, where L is a length of feedback window; obtain feedback information and choose a channel resource set from all usable channel resource sets for actual transmission, according to a state which is constituted by the L bits of ACK/NACK, and wherein two channel resources in the chosen set correspond to two antenna ports respectively; and transmit actual feedback information on the two antenna ports synchronously using the two channel resources in the chosen set, or wherein the user terminal is configured to:

obtain channel resource index for a second antenna port of the two antenna ports by received higher layer signaling; detect one or more PDCCHs, and get all usable channel resources for a first antenna port of the two antenna ports according to indexes of a first CCE of all PDCCHs; receive one or more PDSCHs, get L bits of ACK/NACK information after decoding, where L is a length of feedback window; obtain feedback information and choose one channel resource for the first antenna port of the two antenna ports from all channel resources for the first antenna port for actual transmission, according to a state constituted by the L bits of ACK/NACK information; and transmit actual feedback information on the first and second antenna ports synchronously using two channel resources in the chosen set, or wherein the user terminal is configured to:

detect one or more PDCCHs, and obtain all usable channel resource indexes according to indexes of a first and a second CCEs of all PDCCHs; and choose channel resource indexes corresponding to the first and the second CCEs of a PDCCH for a first and a second antenna ports of the two antenna ports according to a predetermined arrangement; receive one or more PDSCHs, get Md bits of ACK/NACK information after decoding, and perform logic AND for Md bits of ACK/NACK corresponding to a same codeword, obtain 1 or 2 bits feedback information; where Md is the number of received downlink assignments; and transmit the feedback information on the two antenna ports synchronously using two channel resources in the chosen set, so as to realize the transmit diversity, or wherein the user terminal is configured to:

obtain a channel resource index for a second antenna port of the two antenna ports by received higher layer signaling; detect one or more PDCCHs, and obtain all usable channel resource indexes for a first antenna port of the two antenna ports according to indexes of a first CCE of all PDCCHs, and choose one channel resource for the first antenna port according to a predetermined arrangement; receive one or more PDSCHs, get Md bits of ACK/NACK information after decoding, and perform logic AND for Md bits of ACK/NACK corresponding to a same codeword, then obtain 1 or 2 bits feedback information; where Md is the number of received downlink assignments; and transmit actual feedback information on two antenna ports synchronously using two channel resources in the chosen set.

* * * * *